United States Patent
Niinobe et al.

(10) Patent No.: US 8,821,624 B2
(45) Date of Patent: Sep. 2, 2014

(54) CERAMIC EXTRUSION MOLDING COMPOSITION AND BINDER

(75) Inventors: Shingo Niinobe, Joetsu (JP); Kazuhisa Hayakawa, Joetsu (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 279 days.

(21) Appl. No.: 13/337,349

(22) Filed: Dec. 27, 2011

(65) Prior Publication Data

US 2012/0165518 A1    Jun. 28, 2012

(30) Foreign Application Priority Data

Dec. 27, 2010 (JP) ................................. 2010-289172

(51) Int. Cl.
| | | |
|---|---|---|
| C08L 1/26 | (2006.01) | |
| C08L 1/28 | (2006.01) | |
| C04B 35/636 | (2006.01) | |
| B28B 3/26 | (2006.01) | |
| C04B 35/18 | (2006.01) | |
| C04B 38/00 | (2006.01) | |

(52) U.S. Cl.
CPC ............. *C04B 35/6365* (2013.01); *B28B 3/269* (2013.01); *C04B 35/18* (2013.01); *C04B 38/0006* (2013.01); *C04B 2235/6021* (2013.01)
USPC .................. 106/172.1; 106/197.01; 106/198.1

(58) Field of Classification Search
USPC ................................ 106/172.1, 197.01, 198.1
See application file for complete search history.

(56) References Cited

U.S. PATENT DOCUMENTS

| | | |
|---|---|---|
| 3,885,977 A | 5/1975 | Lachman et al. |
| 6,646,093 B2 | 11/2003 | Tsuruta et al. |
| 2003/0071392 A1 | 4/2003 | Sasage et al. |

FOREIGN PATENT DOCUMENTS

| | | |
|---|---|---|
| EP | 1316538 A1 | 6/2003 |
| EP | 2345627 A2 | 7/2011 |
| JP | 2001-348256 A | 12/2001 |
| JP | 2001-355618 A | 12/2001 |
| JP | 2002-037923 A | 2/2002 |
| JP | 2004-203705 A | 7/2004 |

OTHER PUBLICATIONS

The characteristics of SANGELOSE and its applcation, DAIDA Chemical Corporation (No date available).*
US Drug Master Files, (Dec. 3, 2009).*
Cobler, John et al., "Determination of Alkyl Cellulose Ethers by Gas Chromatography", Talanta, 1962, pp. 473-481, vol. 9.
European Search Report dated May 7, 2012 issued in corresponding European application No. 11195115.8.

* cited by examiner

*Primary Examiner* — David M Brunsman
(74) *Attorney, Agent, or Firm* — Westerman, Hattori, Daniels & Adrian, LLP

(57) ABSTRACT

A non-crosslinked, nonionic, water-soluble cellulose ether having a syneresis value of at least 25% by weight in which the hydrogen atom of a hydroxyl group is substituted by a $C_6$-$C_{26}$ alkyl halide, monoepoxide or monoisocyanate is useful as a binder in ceramic extrusion molding.

7 Claims, No Drawings

CERAMIC EXTRUSION MOLDING COMPOSITION AND BINDER

CROSS-REFERENCE TO RELATED APPLICATION

This non-provisional application claims priority under 35 U.S.C. §119(a) on Patent Application No. 2010-289172 filed in Japan on Dec. 27, 2010, the entire contents of which are hereby incorporated by reference.

TECHNICAL FIELD

This invention relates to a binder having a shape retaining ability for use in ceramic extrusion molding, and a ceramic extrusion molding composition comprising the same, especially suited for honeycomb molding.

BACKGROUND ART

In the prior art, ceramic extrusion molding compositions use binders such as starch, polyacrylic acid, polyethylene oxide, alkyl celluloses, hydroxyalkyl celluloses, and hydroxyalkyl alkyl celluloses in aqueous solution form. Of these, alkyl celluloses and hydroxyalkyl alkyl celluloses are in stark contrast to other water-soluble binders having the drawback that aqueous solutions thereof lose an apparent viscosity upon heating so that the bound shape may fail or alter during drying, in that the alkyl celluloses and hydroxyalkyl alkyl celluloses are able to retain the bound shape because their aqueous solutions become gel upon heating. Thus drying proceeds in the state bound by the gel. This binding enables to maintain the molded shape. For this reason, the alkyl celluloses and hydroxyalkyl alkyl celluloses are used in ceramic molding, for example, as the binder having a shape retaining ability during drying.

If the binder forms a gel upon heating, shape retention is satisfactory, but water is trapped within the gel. This interferes with evaporation of water and retards drying. It would thus be desirable to have a water-soluble binder having a shape retaining ability during drying and offering a high drying rate. Furthermore, when the binder is added to a ceramic material in such an amount as to develop a thermal gel strength necessary in the drying step, there arises a problem that the binder provides a high viscosity and causes sticking to the screw and die during extrusion molding, increasing the extrusion pressure. This prevents the ceramic material from being quickly extruded through the die.

Attempts were made to overcome these drawbacks by changing the degree of polymerization or substitution of cellulose ether to tailor its excess viscosity, or by using various organic additives. None of these attempts are fully satisfactory.

CITATION LIST

Patent Document 1: JP-A 2001-348256
Patent Document 2: JP-A 2001-355618
Patent Document 3: JP-A 2004-203705

DISCLOSURE OF INVENTION

An object of the invention is to provide a binder and a ceramic extrusion molding composition comprising the same, which composition is extrusion moldable at a high molding rate into parts free of drying cracks.

The inventors have found that a non-crosslinked, nonionic, water-soluble cellulose ether having a hydroxyl group substituted with an alkyl halide, monoepoxide or monoisocyanate and having a syneresis value of at least 25% by weight is a useful binder; the binder displays thermal gelation in aqueous solution form and provides a ceramic composition with a viscosity behavior that the viscosity at a high shear rate during extrusion molding is extremely lower than the viscosity under no shearing conditions immediately after extrusion molding; and the ceramic composition possesses good shape retention in a duration from molding to drying even when the extrusion molding rate is increased and ensures effective extrusion molding followed by fast drying.

In one aspect, the invention provides a binder for use in ceramic extrusion molding, consisting of a non-crosslinked, nonionic, water-soluble cellulose ether in which the hydrogen atom of a hydroxyl group on the molecule is substituted by a halide, monoepoxide or monoisocyanate having an alkyl group of 6 to 26 carbon atoms, the cellulose ether having a syneresis value of at least 25% by weight.

In another aspect, the invention provides a ceramic extrusion molding composition comprising a non-crosslinked, nonionic, water-soluble cellulose ether in which the hydrogen atom of a hydroxyl group on the molecule is substituted by a halide, monoepoxide or monoisocyanate having an alkyl group of 6 to 26 carbon atoms, the cellulose ether having a syneresis value of at least 25% by weight.

The composition is typically used in honeycomb molding. Preferably the cellulose ether is a non-crosslinked, nonionic, water-soluble cellulose ether in which the hydrogen atom of a hydroxyl group is substituted by a monoepoxide having an alkyl group of 6 to 26 carbon atoms and more preferably a hydroxypropyl methyl cellulose in which the hydrogen atom of a hydroxyl group is substituted by a monoepoxide having an alkyl group of 6 to 26 carbon atoms.

ADVANTAGEOUS EFFECTS OF INVENTION

A ceramic composition comprising the binder is effectively extrusion molded into a ceramic part. Even when the extrusion molding rate is increased, the molded part maintains its shape during ejection, cutting and drying steps after molding.

DESCRIPTION OF EMBODIMENTS

The singular forms "a", "an" and "the" include plural referents unless the context clearly dictates otherwise. The notation (Cn-Cm) means a group containing from n to m carbon atoms per group.

The invention provides a binder in the form of a non-crosslinked, nonionic, water-soluble cellulose ether, specifically a non-crosslinked, nonionic, water-soluble cellulose ether in which a hydroxyl group on the molecule is substituted with a halide, monoepoxide or monoisocyanate having an alkyl group of 6 to 26 carbon atoms. The cellulose ether should have a syneresis value of at least 25% by weight.

The non-crosslinked, nonionic, water-soluble cellulose ether in which the hydrogen atom of a hydroxyl group on the molecule is substituted by a $C_6$-$C_{26}$ alkyl halide, monoepoxide or monoisocyanate may be prepared from a nonionic, water-soluble cellulose ether as a starting material, which may be selected from among alkyl celluloses, hydroxyalkyl celluloses, and hydroxyalkyl alkyl celluloses, such as methyl cellulose containing 25 to 35 wt % methoxy groups, hydroxyethyl cellulose containing 25 to 65 wt % hydroxyethoxy groups, hydroxypropyl cellulose containing 30 to 65 wt % of hydroxypropoxy groups, hydroxyethyl methyl cellulose containing 20 to 35 wt % methoxy groups and 1 to 20 wt % of hydroxyethoxy groups, hydroxypropyl methyl cellulose containing 20 to 35 wt % of methoxy groups and 1 to 20 wt % of hydroxypropoxy groups, and hydroxyethyl ethyl cellulose containing 10 to 50 wt % of ethoxy groups and 1 to 50 wt % of hydroxyethoxy groups. Although the molecular weight of the cellulose ether is not particularly limited, it is preferred for handling that the cellulose ether have a molecular weight corresponding to a viscosity of 5 to 1,000,000 mPa-s, more preferably 200 to 300,000 mPa-s, as measured in a 2 wt % aqueous solution at 20° C. If this viscosity is less than 5 mPa-s, a sufficient viscosity may not be reproduced by an extrusion molding composition with a suitable loading of the binder. If this viscosity exceeds 1,000,000 mPa-s, a composition may have too high a viscoelasticity to extrude. It is noted that the viscosity is measured by a Brookfield viscometer. A viscosity in the low range of 5 to 95,000 mPa-s is read by rotating a BL rotor at 60 rpm, and a viscosity in the high range of 95,000 to 1,000,000 mPa-s read by rotating a BH rotor at 30 rpm.

The nonionic, water-soluble cellulose ether is then reacted with a modifying agent which is a halide, monoepoxide or monoisocyanate having an alkyl group of 6 to 26 carbon atoms whereby the hydrogen atoms of hydroxyl groups are substituted by the alkyl group of 6 to 26 carbon atoms or a group comprising the same.

Examples of the alkyl halide, monoepoxide or monoisocyanate include stearyl chloride, palmityl chloride, stearyl isocyanate, lauryl isocyanate, stearyl epoxide, palmityl epoxide, lignoceryl epoxide, cerotyl epoxide, stearylglycidyl ether, decylglycidyl ether, and hexylglycidyl ether.

This reaction may be carried out by any well-known methods as described in JP-B H01-028041 and JP-A H11-228601. Specifically, the nonionic cellulose ether is diluted with an inert organic solvent to form a slurry. A solution of an alkali metal hydroxide is added to the slurry. When the ether is wetted and swollen with the alkali, an alkyl halide or epoxide is added to the solution, which is stirred until the completion of reaction. Thereafter, the residual alkali is neutralized, whereupon the reaction product is recovered, washed with an inert organic solvent, and dried, obtaining the desired product.

A molar amount of substituent group introduced by the modifying agent, referred to as "degree of substitution" hereinafter, is such that the modified cellulose ether may dissolve in water to provide a viscosity buildup. The degree of substitution is, on the average, preferably 0.01 to 0.9% by weight, more preferably 0.2 to 0.6% by weight, and even more preferably 0.3 to 0.5% by weight. The degree of substitution may be determined by the Zeisel gas chromatography technique described in J. G. Gobler, E. P. Samsel, and G. H. Beaber, Talanta, 9, 474 (1962).

The non-crosslinked, nonionic, water-soluble cellulose ether in which hydroxyl groups on the molecule are substituted with a $C_6$-$C_{26}$ alkyl halide, monoepoxide or monoisocyanate should have a syneresis value of at least 25% by weight. As used herein, the term "syneresis" refers to the separation of water from a gel due to contraction of the gel, and the "syneresis value" of a cellulose refers to a percentage of the total weight of water and water vapor exuded from a cellulose gel divided by the weight of the gel. Specifically, 30 g of 2.5 wt % aqueous solution of the non-crosslinked, nonionic, water-soluble cellulose ether kept at 20° C. is placed in a 30-ml beaker and heated in a household microwave oven (max. 600 W) at a low power level (180 W) for 3 minutes to form a gel. Once the gel is weighed, it is transferred to a petri dish and heated again in the microwave oven under the same conditions for 4 minutes. At this point, the total weight of water and water vapor separated from the gel is measured. A syneresis value is computed by dividing the total weight of water and water vapor separated from the gel by the weight of the gel formed. The syneresis value should be at least 25 wt %. If the syneresis value is low, water is trapped within the gel to retard heat drying. The syneresis value is preferably 25 to 50 wt % and more preferably 30 to 40 wt %.

It is noted that a syneresis value of at least 25 wt % may be achieved by substituting a hydroxyl group on the starting water-soluble cellulose ether with a $C_6$-$C_{26}$ alkyl halide, monoepoxide or monoisocyanate.

As the cellulose ether, a hydrophobic cellulose ether commercially available under the trade name Sungelose® from Daido Chemical Corp. may be used as long as it has a syneresis value of at least 25 wt %.

Another embodiment of the invention is a ceramic extrusion molding composition comprising the non-crosslinked, nonionic, water-soluble cellulose ether defined herein and a ceramic material. The ceramic material used herein encompasses those materials which form glass ceramics or ceramics upon firing. Examples include clays such as cordierite, mullite, and bentonite, as described in U.S. Pat. No. 3,885,977, talc, zircon, zirconia, spinel, alumina, and precursors thereof, carbides (e.g., silicon carbide), nitrides (e.g., silicon nitride), silicates, aluminates, lithium aluminosilicate, alumina, silica, titania, fused silica, borides, soda lime, aluminosilicate, borosilicate, soda-barium silicate, and aluminum titanate.

Any molding formulation may be used herein as long as the desired properties are obtained. Preferably the molding composition is formulated by combining 100 parts by weight of the ceramic material with 3 to 20 parts by weight of the binder or non-crosslinked, nonionic, water-soluble cellulose ether and 15 to 40 parts by weight of water. When the composition using the binder is molded, the heating temperature is preferably 60 to 105° C.

In the ceramic extrusion molding composition, any of commonly used celluloses such as methyl cellulose, hydroxypropyl methyl cellulose, hydroxyethyl methyl cellulose or hydroxyethyl cellulose may be admixed insofar as the performance of the cellulose ether defined herein is not impaired. Also surfactants may be added for improving the plasticity of dry parts after molding, for example, glycerol derivatives such as glycerol and glycerol fatty acid esters, sorbitan fatty acid esters, and polyalkylene glycols.

The method of preparing the ceramic extrusion molding composition is not particularly limited. In one preferred embodiment, a molding composition is prepared by mixing the essential and optional components in water on a mixing unit until uniform, and milling the mixture on a two-roll kneader, roll mill or the like. The composition is molded into a part, typically using a vacuum screw extrusion molding machine. The molded part may take any desired shape including sheet, pipe and honeycomb. The invention is most advantageous in the molding of honeycomb and pipe structures which tend to change their shape or collapse in a duration from molding to drying.

EXAMPLE

Examples of the invention are given below by way of illustration and not by way of limitation.

Synthesis Example 1

Synthesis of Non-Crosslinked, Nonionic, Water-Soluble Cellulose Ether in Which the Hydrogen of Hydroxyl Group on the Molecule is Substituted by $C_{18}$ Alkyl Monoepoxide In 400 g of tert-butyl alcohol was dispersed 40 g of methyl cellulose having a viscosity of 4,100 mPa-s in 2 wt % aqueous solution at 20° C. (Metolose® SM-4000, Shin-Etsu Chemical Co., Ltd.). A 6 wt % sodium hydroxide aqueous solution, 35 g, was added to the dispersion, which was stirred for 2 hours in a nitrogen blanket. Stearylglycidyl ether (Epiol® SK by NOF Corp.), 75 g, was added to the dispersion, which was stirred at 50° C. for 4 hours. The reaction solution was neutralized with acetic acid and cooled whereupon a solid matter was filtered. It was washed two times with a 10-fold weight of hexane/acetone and further with a 100-fold weight of hot water, obtaining a modified cellulose ether.

The product had a viscosity of 110,000 mPa-s in 2 wt % aqueous solution at 20° C.

Synthesis Example 2

Synthesis of Non-Crosslinked, Nonionic, Water-Soluble Cellulose Ether in Which the Hydrogen of Hydroxyl Group on the Molecule is Substituted by $C_{20}$ Alkyl Monoepoxide In 400 g of tert-butyl alcohol was dispersed 40 g of hydroxypropyl methyl cellulose having a viscosity of 30,100 mPa-s in 2 wt % aqueous solution at 20° C. (Metolose® 90SH-30000, Shin-Etsu Chemical Co., Ltd.). A 6 wt % sodium hydroxide aqueous solution, 35 g, was added to the dispersion, which was stirred for 2 hours in a nitrogen blanket. Decylglycidyl ether (Epiol® L-41 by NOF Corp.), 75 g, was added to the dispersion, which was stirred at 50° C. for 4 hours. The reaction solution was neutralized with acetic acid, cooled, and poured into 800 g of hexane whereupon a solid matter was filtered. It was washed two times with a 10-fold weight of hexane/acetone and further with a 100-fold weight of hot water, obtaining a modified cellulose ether.

The product had a viscosity of 400,000 mPa-s in 2 wt % aqueous solution at 20° C.

Synthesis Example 3

Synthesis of Non-Crosslinked, Nonionic, Water-Soluble Cellulose Ether in Which the Hydrogen of Hydroxyl Group on the Molecule is Substituted by $C_{26}$ Alkyl Monoepoxide In 400 g of tert-butyl alcohol was dispersed 40 g of hydroxyethyl methyl cellulose having a viscosity of 3,900 mPa-s in 2 wt % aqueous solution at 20° C. (SEB-04T, Shin-Etsu Chemical Co., Ltd.). A 6 wt % sodium hydroxide aqueous solution, 35 g, was added to the dispersion, which was stirred for 2 hours in a nitrogen blanket. Palmityl epoxide, 75 g, was added to the dispersion, which was stirred at 50° C. for 4 hours. The reaction solution was neutralized with acetic acid, cooled, and poured into 800 g of hexane whereupon a solid matter was filtered. It was washed two times with a 10-fold weight of hexane/acetone and further with a 100-fold weight of hot water, obtaining a modified cellulose ether.

The product had a viscosity of 110,000 mPa-s in 2 wt % aqueous solution at 20° C.

Synthesis Example 4

Synthesis of Non-Crosslinked, Nonionic, Water-Soluble Cellulose Ether in Which the Hydrogen of Hydroxyl Group on the Molecule is Substituted by $C_6$ Alkyl Monoisocyanate A 250-ml three-neck round bottom flask equipped with a stirrer and reflux condenser was charged with 25 ml of xylene (industrial grade isomer mixture) and 15.0 g of ethyl hydroxyethyl cellulose (Bermocoll® E481 by Akzo Nobel). The contents were stirred to form a suspension. At room temperature, 1.5 g of a 10 wt % xylene solution of 4,4'-methylenebis(cyclohexylisocyanate) (Desmodur® W by Bayern AG) and 0.15 g of Octa-Soligen® Zinn 28 (Borchers GmbH) were added to the mixture. This reaction batch was stirred at 50° C. for one hour. The thus modified cellulose was filtered and dried at room temperature for 24 hours.

The product had a viscosity of 300,000 mPa-s in 2 wt % aqueous solution at 20° C.

Synthesis Example 5

Synthesis of Non-Crosslinked, Nonionic, Water-Soluble Cellulose Ether in Which the Hydrogen of Hydroxyl Group on the Molecule is Substituted by $C_{18}$ Alkyl Monoepoxide In 400 g of tert-butyl alcohol was dispersed 40 g of methyl cellulose having a viscosity of 4,100 mPa-s in 2 wt % aqueous solution at 20° C. (Metolose® SM-4000, Shin-Etsu Chemical Co., Ltd.). A 6 wt % sodium hydroxide aqueous solution, 13 g, was added to the dispersion, which was stirred for 2 hours in a nitrogen blanket. Stearylglycidyl ether (Epiol® SK by NOF Corp.), 28 g, was added to the dispersion, which was stirred at 50° C. for 4 hours. The reaction solution was neutralized with acetic acid and cooled whereupon a solid matter was filtered. It was washed two times with a 10-fold weight of hexane/acetone and further with a 100-fold weight of hot water, obtaining a modified cellulose ether.

The product had a viscosity of 100,000 mPa-s in 2 wt % aqueous solution at 20° C.

Examples 1 to 5 and Comparative Examples 1 to 4

The modified cellulose ethers in Synthesis Examples 1 to 4 and non-modified cellulose ethers are tabulated in Table 1 as having a content of methoxy, ethoxy, hydroxyethoxy, hydroxypropoxy, stearyloxypropoxy or the like and a viscosity as measured in a 2 wt % aqueous solution at 20° C. by a Ubbelohde viscometer according to JIS K-2283-1993. The syneresis value, thermal gel hardness and drying rate of these cellulose ethers were examined as follows.

Syneresis Value and Thermal Gel Hardness 30 g of a 2.5 wt % aqueous solution of a cellulose ether (Table 1) kept at 20° C. was placed in a 30-ml beaker and heated in a household microwave oven (max. 600 W) at a low power level (180 W) for 3 minutes to form a gel. Once the gel was weighed, it was transferred to a Petri dish and heated again in the microwave oven at the low power level for 4 minutes. At this point, a total weight of water and water vapor separated from the gel was measured. A syneresis value (wt %) was computed by dividing the total weight of water and water vapor separated from the gel by the weight of the gel formed, with the result shown in Table 1. The gel prior to the transfer to the dish was observed. The thermal gel hardness of aqueous solution was rated good (○) when the gel was observed to have a self-sustainable shape, or poor (×) when the gel was observed to have no shape and flow as liquid.

Drying Rate 10 g of a 2 wt % aqueous solution of a cellulose ether (Table 1) was placed in a Petri dish of 85 mm diameter and heated in an oven at 80° C. for 4 hours for drying. The drying rate of a sample was rated good (○) when the residue was dry, with the water completely evaporated off, or poor (×) when residual water was found.

Dependence of Viscosity on Shear Rate

A 2 wt % aqueous solution of a cellulose ether (Table 1) was subjected to constant rotation at a low speed of 0.1 (1/s) for 300 seconds. A viscosity was measured for 180 seconds at the same speed of 0.1 (1/s), and then for 60 seconds at a high speed of 1,000 (1/s) while breaking the structure. Immediately thereafter, a viscosity was measured again at the speed of 0.1 (1/s) for 720 seconds for determining a structural recovery or viscosity recovery. The sample was rated good (○) when the measured viscosity was recovered to at least 300 times or poor (×) when the measured viscosity was recovered to less than 300 times. The results are shown in Table 1.

As seen from Table 1, the cellulose ethers within the scope of the invention display a high gel strength, a fast drying rate, and dependence of viscosity on shear rate.

Extrusion Molding of Ceramic Composition

A ceramic extrusion molding composition was prepared by combining and milling 6 parts by weight of a cellulose ether (Table 1), 100 parts by weight of alumina, and 21 parts by weight of water on a three-roll mill. Using a vacuum screw extrusion molding machine with a screw diameter of 25 mm (Miyazaki Iron Works Co., Ltd.), the composition was extrusion molded into a green honeycomb structure at an extrusion speed of 2 cm/min, the honeycomb structure having 25 cells of 2 cm squares with a wall gage of 0.2 mm. The honeycomb structure was cut to a length of 4 cm by means of a metal wire and dried at 90° C. The molded parts were observed, finding that the shape was not distorted.

A honeycomb structure was similarly molded at an extrusion speed of 6 cm/min by increasing the screw rotational speed 4 times. After drying, the molded parts were observed. The part was rated good (○) when its shape was not distorted or poor (×) when its shape was distorted. The results are shown in Table 1.

TABLE 1

|  |  |  | Example | | | | | Comparative Example | | | |
| --- | --- | --- | --- | --- | --- | --- | --- | --- | --- | --- | --- |
|  |  |  | 1 | 2 | 3 | 4 | 5 | 1 | 2 | 3 | 4 |
| Non-crosslinked, nonionic, water-soluble cellulose ether | Degree of substitution (wt %) | Methoxy | 30.0 | 24.8 | 24.8 |  | 30.5 | 30.0 | 24.8 | 24.8 |  |
|  |  | Ethoxy |  |  |  | 13.6 |  |  |  |  | 13.6 |
|  |  | Hydroxyethoxy |  |  | 10.0 | 38.0 |  |  |  | 10.0 | 38.0 |
|  |  | Hydroxypropoxy |  | 8.0 |  |  |  |  | 8.0 |  |  |
|  |  | Stearyloxyhydroxypropoxy | 0.8 |  |  |  |  | 0.3 |  |  |  |
|  |  | Decyloxyhydroxypropoxy |  | 0.9 |  |  |  |  |  |  |  |
|  |  | Palmityloxyhydroxypropoxy |  |  |  | 0.5 |  |  |  |  |  |
|  |  | Cyclohexyl isocyanurate |  |  |  |  | 0.8 |  |  |  |  |
|  | Viscosity in 2 wt % aqueous solution at 20° C. (mPa-s) |  | 110,000 | 400,000 | 110,000 | 300,000 | 100,000 | 8,000 | 30,000 | 60,000 | 60,000 |
| Evaluation | Syneresis value (wt %) |  | 25 | 34 | 30 | 33 | 27 | 19 | 22 | 18 | 18 |
|  | Thermal gel hardness |  | ○ | ○ | ○ | ○ | ○ | ○ | × | × | × |
|  | Drying rate |  | ○ | ○ | ○ | ○ | ○ | × | × | × | × |
|  | Shear rate dependence |  | ○ | ○ | ○ | ○ | ○ | × | × | × | × |
| Extrusion molding of ceramic composition |  |  | ○ | ○ | ○ | ○ | ○ | × | × | × | × |

Japanese Patent Application No. 2010-289172 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A ceramic extrusion molding composition comprising a ceramic material and a non-crosslinked, nonionic, water-soluble cellulose ether in which the hydrogen atom of a hydroxyl group on the molecule is substituted by a halide, monoepoxide or monoisocyanate having an alkyl group of 6 to 26 carbon atoms, said cellulose ether having a syneresis value of at least 25% by weight.

2. The composition of claim 1 which is used in honeycomb molding.

3. The composition of claim 1 wherein said cellulose ether is a non-crosslinked, nonionic, water-soluble cellulose ether in which the hydrogen atom of a hydroxyl group is substituted by a monoepoxide having an alkyl group of 6 to 26 carbon atoms.

4. The composition of claim 1 wherein said cellulose ether is a hydroxypropyl methyl cellulose in which the hydrogen atom of a hydroxyl group is substituted by a monoepoxide having an alkyl group of 6 to 26 carbon atoms.

5. The composition of claim 1 wherein the cellulose ether to be substituted by the halide, monoepoxide or monoisocyanate is methyl cellulose containing 25 to 35 wt % methoxy groups, hydroxyethyl cellulose containing 25 to 65 wt % hydroxyethoxy groups, hydroxypropyl cellulose containing 30 to 65 wt % of hydroxypropoxy groups, hydroxyethyl methyl cellulose containing 20 to 35 wt % methoxy groups and 1 to 20 wt % of hydroxyethoxy groups, hydroxypropyl methyl cellulose containing 20 to 35 wt % of methoxy groups and 1 to 20 wt % of hydroxypropoxy groups, or hydroxyethyl ethyl cellulose containing 10 to 50 wt % of ethoxy groups and 1 to 50 wt % of hydroxyethoxy groups.

6. The composition of claim 1 wherein the halide, monoepoxide or monoisocyanate is stearyl chloride, palmityl chloride, stearyl isocyanate, lauryl isocyanate, stearyl epoxide, palmityl epoxide, lignoceryl epoxide, cerotyl epoxide, stearylglycidyl ether, decylglycidyl ether, or hexylglycidyl ether.

7. The composition of claim 1 which comprises 100 parts by weight of a ceramic material, 3 to 20 parts by weight of the non-crosslinked, nonionic, water-soluble cellulose ether and 15 to 40 parts by weight of water.

* * * * *